(12) United States Patent
Scholl et al.

(10) Patent No.: US 10,540,120 B2
(45) Date of Patent: Jan. 21, 2020

(54) CONTENTION AVOIDANCE ON ASSOCIATIVE COMMUTATIVE UPDATES

(71) Applicant: International Business Machines Corporation, Armonk, NY (US)

(72) Inventors: Daniel J. Scholl, Chicago, IL (US); Ravi V. Khadiwala, Bartlett, IL (US); Greg R. Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 15/812,954

(22) Filed: Nov. 14, 2017

(65) Prior Publication Data

US 2019/0146711 A1 May 16, 2019

(51) Int. Cl.
*G06F 3/06* (2006.01)
*G06F 11/10* (2006.01)
*H04L 29/08* (2006.01)

(52) U.S. Cl.
CPC ............ *G06F 3/067* (2013.01); *G06F 3/0604* (2013.01); *G06F 3/0619* (2013.01); *G06F 3/0659* (2013.01); *G06F 11/1076* (2013.01); *H04L 67/1097* (2013.01)

(58) Field of Classification Search
CPC ...... G06F 3/0659; G06F 3/067; G06F 3/0619; G06F 3/0604; G06F 11/1076; G06F 11/1096; G06F 11/108; G06F 3/0614; G06F 3/0601; H04L 67/1097
See application file for complete search history.

(56) References Cited

U.S. PATENT DOCUMENTS

| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Shelly A Chase
(74) *Attorney, Agent, or Firm* — Garlick & Markison; Timothy W. Markison; Patricia A. Markison

(57) ABSTRACT

A method includes, during a given time interval, receiving a plurality of write requests regarding updates to an object, creating a plurality of write intent messages for the plurality of write requests, dispersed storage error encoding the plurality of write intent messages to produce a plurality of sets of encoded intent slices, and sending the plurality of sets of encoded intent slices to a set of storage units of the DSN for storage therein. The method further includes, after expiration of the given time interval, categorizing each write intent message of the plurality of write intent messages with respect to other write intent messages of the plurality of write intent messages, where a write intent message is categorized as complimentary, non-compete, or compete, creating a single write command that encompasses complimentary and non-compete write intent messages, and executing the single write command on the object to produce an updated object.

14 Claims, 8 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2016/0255150 A1* | 9/2016 | Dhuse ............... G06F 3/067 709/213 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

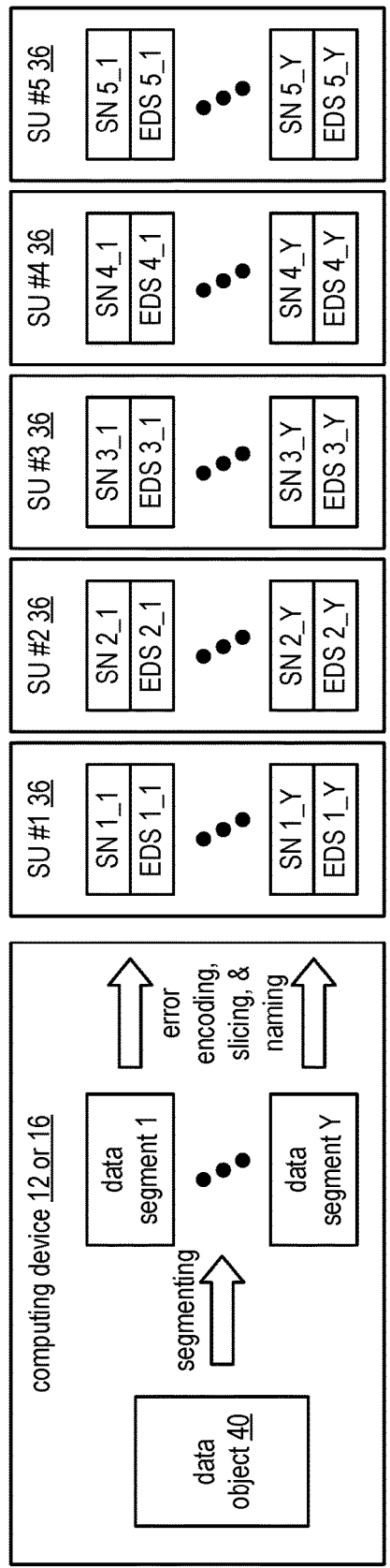
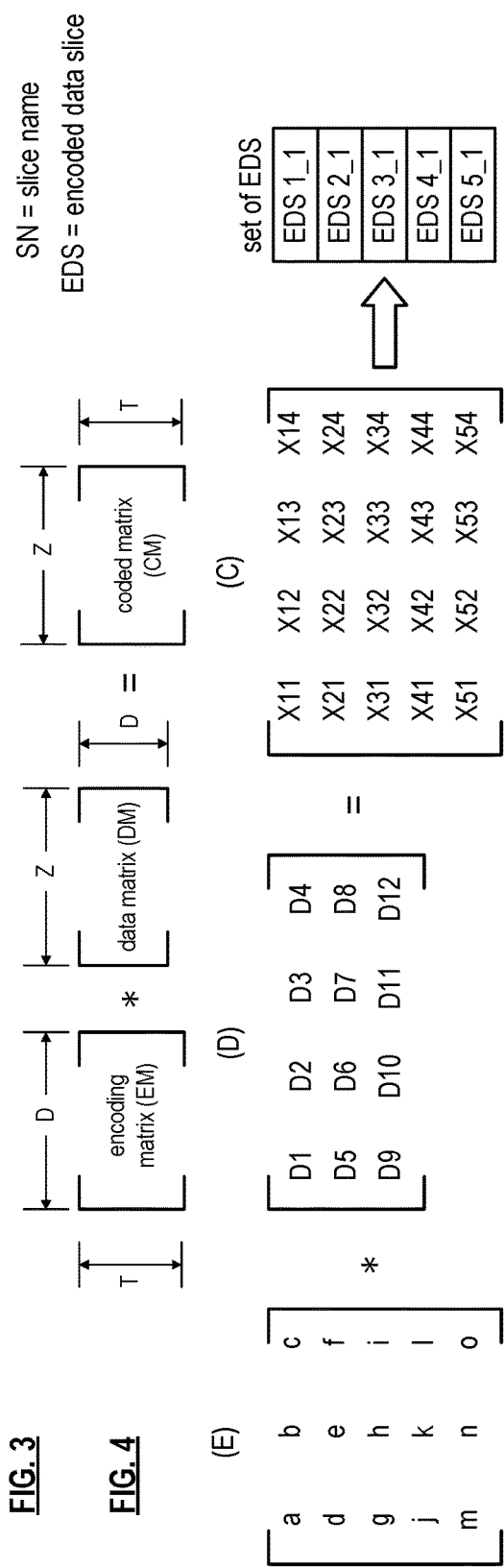
FIG. 3
FIG. 4
FIG. 5
FIG. 6

CONTENTION AVOIDANCE ON ASSOCIATIVE COMMUTATIVE UPDATES

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a dispersed storage system, it is further known that frequent contending updates to an object can incur performance penalties.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
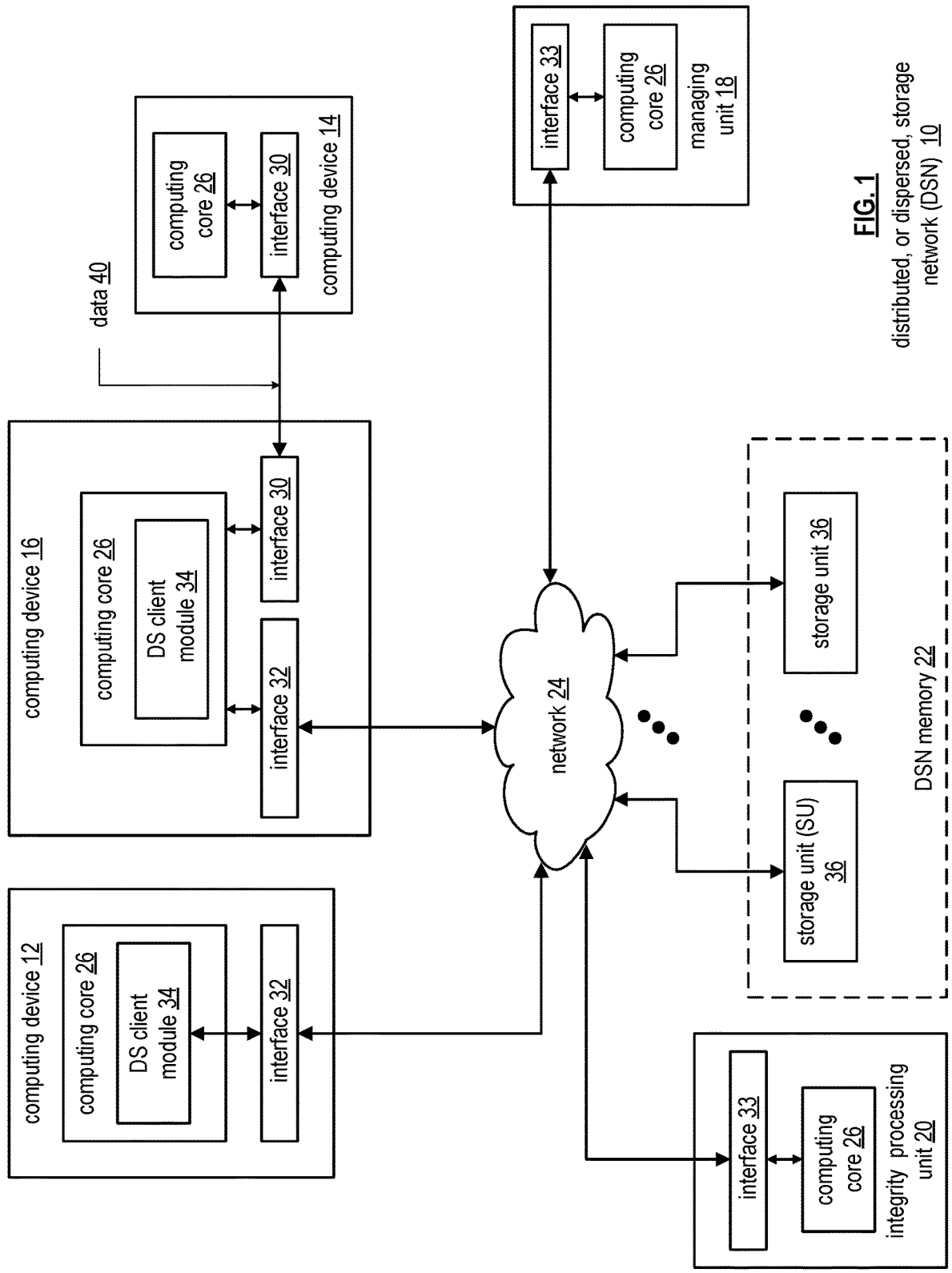
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
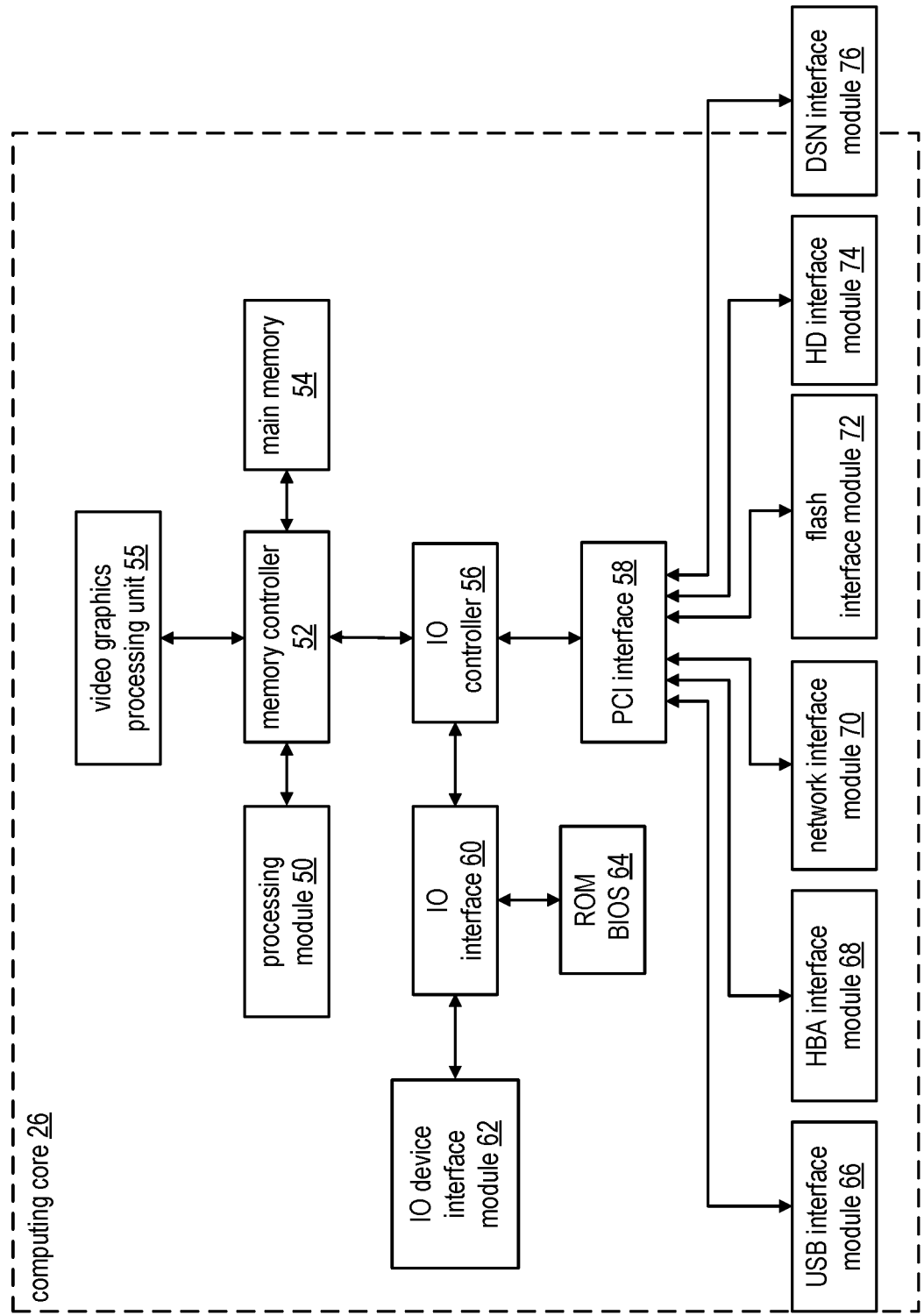
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5 Y.

Figures 7, 8:
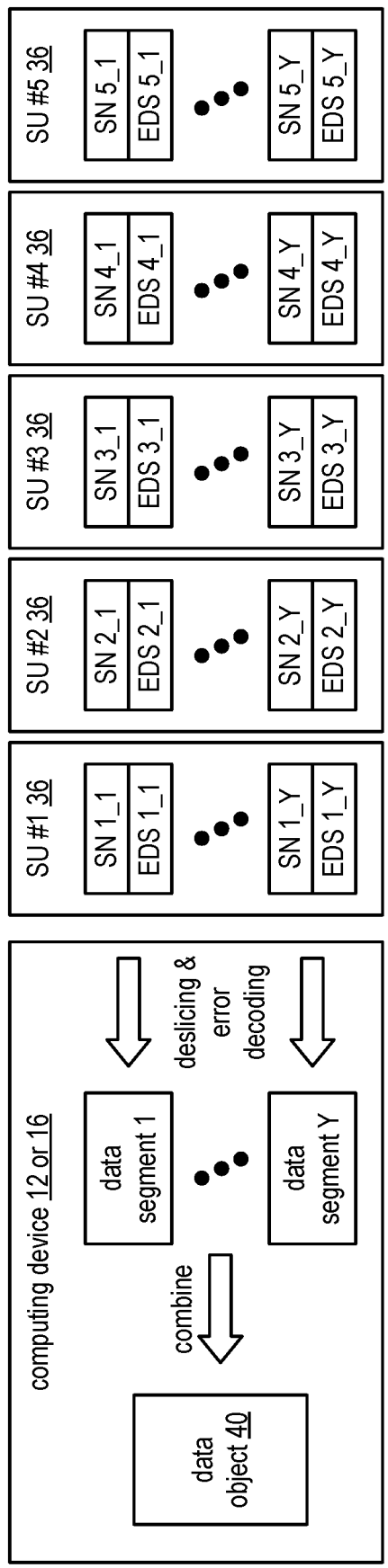
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
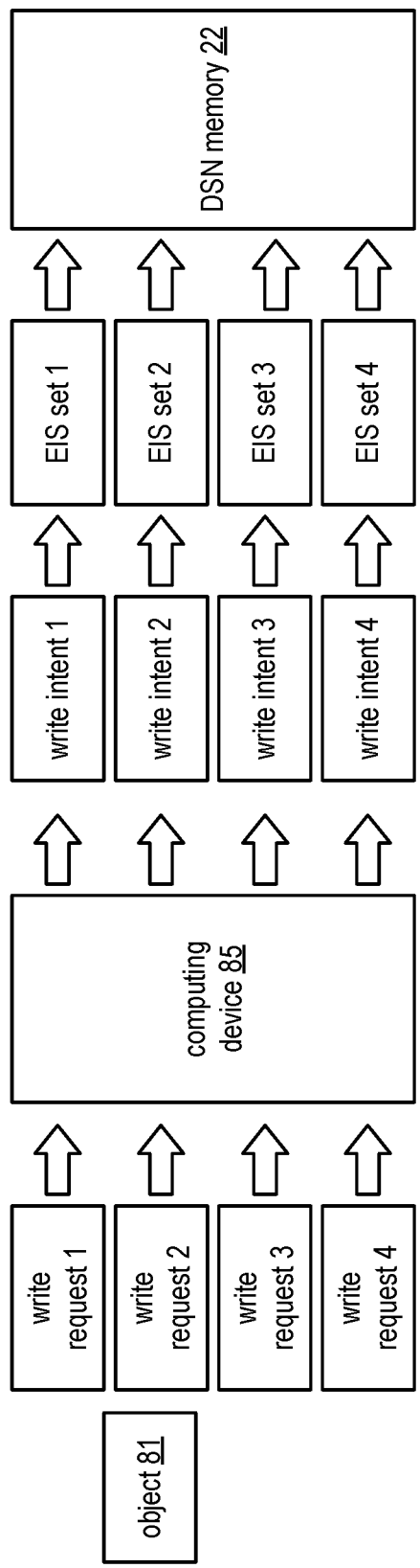
FIGS. 9A and 9B are schematic block diagrams of an example of updating an object using contention avoidance in accordance with the present invention.
Figure 9B:
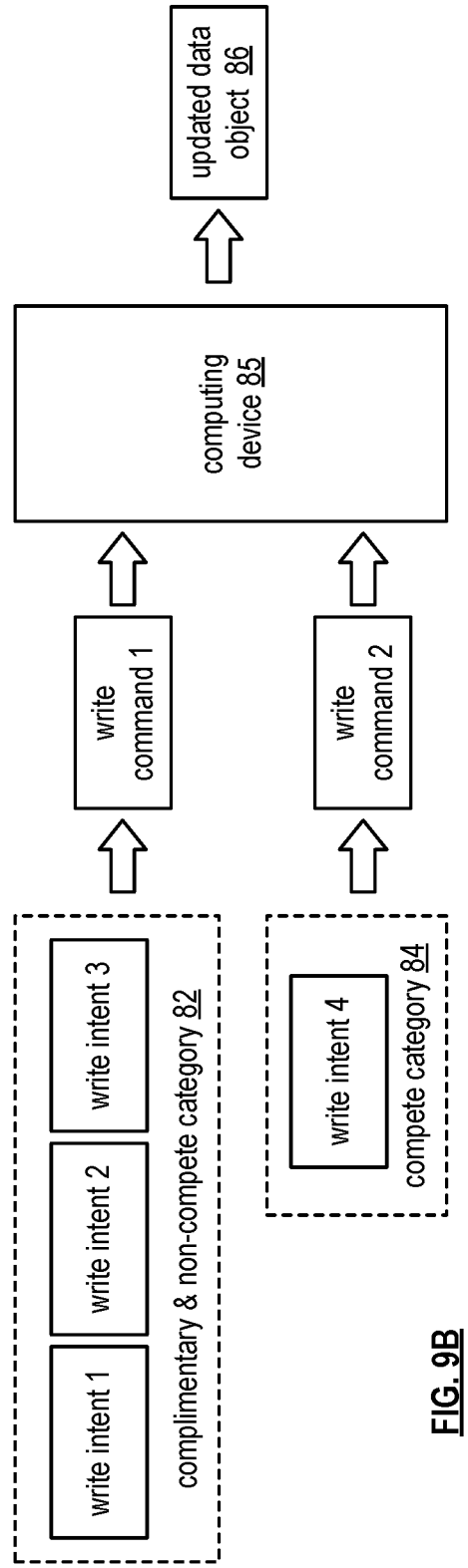

FIGS. 9A and 9B are schematic block diagrams of an example of updating an object 81 using contention avoidance. FIG. 9A includes object 81, computing device 85 (e.g., a dispersed storage (DS) processing unit or a storage unit) of a dispersed storage network (DSN), and the DSN memory 22. During a given time period, the computing device 85 receives a plurality of write requests (e.g., write requests 1-4) regarding updates to the object 81. Frequent and contending updates to a single object can incur performance penalties. To first address this problem, computing device 85 creates a plurality of write intent messages (e.g., write intents 1-4) for the plurality of write requests to ensure update consistency. A write intent message of the plurality of write intent messages includes a copy of a corresponding write request of the plurality of write requests and an intent overlay. The computing device 85 dispersed storage error encodes the plurality of write intent messages to produce a plurality of sets of encoded intent slices (e.g., EIS sets 1-4) and sends the plurality of sets of encoded intent slices to the DSN memory 22 for storage therein. Persisting the write intent messages to the DSN memory 22 guarantees durability of the updates.

Having many write intent messages live in the DSN memory 22 for long periods of time can have a significant performance impact and greatly increase the cost of the eventual update to the object. Grouping write intents that are non-competing or complimentary (i.e., there is no contention between the updates) can greatly reduce write intent performance penalties. After the expiration of the given time period, FIG. 9B depicts the computing device 85 categorizing each write intent 1-4 with respect to each other write intent message 1-4 into a complimentary category, a non-compete category, or a compete category.

The computing device 85 determines that a write intent message is categorized in the complimentary category when the write intent message is regarding an update that is composable, commutative, and/or associative with one other update of the updates. Two updates (f1, f2) are composable if a third update (f1.f2) can be created such that applying f2 then f1 to the object is the same as applying (f1.f2) to the object. Two updates (f1, f2) are commutative if applying (f1.f2) to the object is the same as applying (f2f1) to the object. Two updates (f1, f2) are associative is applying f1.(f2.f3) to the object is the same as applying (f1.f2).f3 to the object. This example is discussed in greater detail with reference to FIGS. 10A and 10B.

The computing device 85 determines that a write intent message is categorized in the non-compete category when the write intent message is regarding an update that is updating a unique segment of the object 81 (e.g., a write intent message regarding updating a first segment of the object is non-competing in comparison to a write intent message regarding updating a second segment of the object). This example is discussed in greater detail with reference to FIGS. 11A and 11B. Write intent messages that are not categorized into the complimentary or non-compete category are categorized into the compete category.

As an example, the computing device 85 categorized write intents 1-3 in the complimentary or non-compete category 82 and categorized write intent 4 in the compete category 84. A single write command is created to encompass the write intents in the complimentary or non-compete category 82 while each write intent in the compete category requires an individual write command. For example, the computing device 85 creates a single write command (write command 1) that encompasses write intents 1-3 and a write command (write command 2) for write intent 4.

The computing device 85 and/or another computing device of the DSN executes write command 1 and write command 2 to produce the updated object 86. For example, the original computing device 85 that received the plurality of write requests executes the write commands. Alternatively, another computing device associated with the object 81 (e.g., an owner of the object) executes the write commands. To execute write commands 1 and 2, the computing device 85 (and/or the other computing device) obtains the plurality of sets of encoded data slices of the object 81 from a set of storage units of the DSN. The computing device 85 decodes the plurality of sets of encoded data slices to produce the object 81 and updates the object in accordance with write commands 1 and 2 to produce the updated object 86. The computing device 85 dispersed storage error encodes the updated object 86 to produce an updated plurality of sets of encoded data slices, and sends the updated plurality of sets of encoded data slices to the set of storage units of the DSN for storage therein. After the object is updated, the computing device 85 deletes write intents 1-4.

Figure 10A:
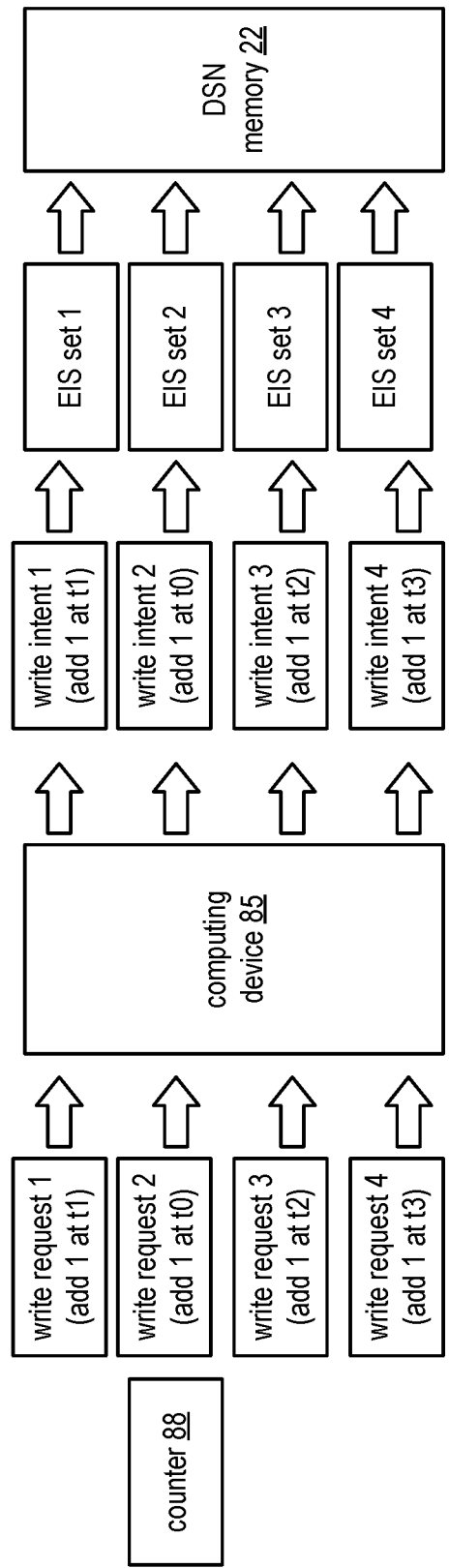
FIGS. 10A and 10B are schematic block diagrams of another example of updating an object using contention avoidance in accordance with the present invention.
Figure 10B:
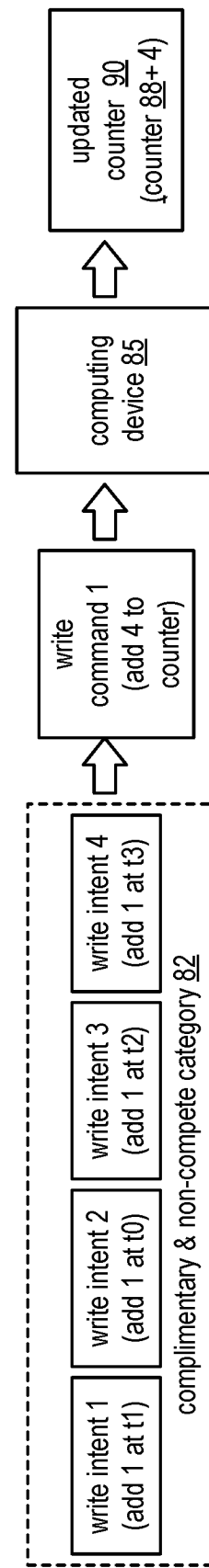

FIGS. 10A and 10B are schematic block diagrams of another example of updating an object using contention avoidance. FIG. 10A includes counter 88 (as the object), computing device 85 (e.g., a DS processing unit or a storage unit) of a dispersed storage network (DSN), and DSN memory 22.

During a given time period, the computing device 85 receives a plurality of write requests (e.g., write requests 1-4) regarding updates to the counter 88. In particular, computing device 85 receives write request 1 to add 1 to the counter 88 at time t1, write request 2 to add 1 to the counter 88 at time t0, write request 3 to add 1 to the counter 88 at time t2, and write request 4 to add 1 to the counter 88 at time t3. The computing device 85 creates write intent messages (e.g., write intents 1-4) for write requests 1-4. A write intent message of the write intent messages includes a copy of a corresponding write request of the plurality of write requests and an intent overlay.

The computing device 85 dispersed storage error encodes write intents 1-4 to produce a plurality of sets of encoded intent slices (e.g., EIS sets 1-4) and sends the plurality of sets of encoded intent slices to the DSN memory 22 for storage therein. After the expiration of the given time period, FIG. 10B depicts the computing device 85 categorizing each write intent 1-4 with respect to each other write intent message 1-4 into a complimentary category, a non-compete category, or a compete category. The computing device 85 determines that write intents 1-4 are complimentary because each write intent message 1-4 is regarding an update that is composable, commutative, and associative with the other updates.

Write intents 1-4 (W1, W2, W3, and W4) are composable because:
(W1)+(W2)+(W3)+(W4)=W5=+4; and
W5+counter=(W1)+(W2)+(W3)+(W4)+counter.
Write intents 1-4 are commutative because:
(W1)+(W2)+(W3)+(W4)+counter=4+counter; and
(W4)+(W3)+(W2)+(W1)+counter=4+counter.
Write intents 1-4 are associative because:
(W1)+[(W2)+(W3)+(W4)]+counter=4+counter; and
[(W1)+(W2)+(W3)]+(W4)+counter=4+counter.

Because the write intents 1-4 are complimentary, write intents 1-4 are therefore categorized in the complimentary and non-compete category 82. A single write command (write command 1) is created to encompass write intents 1-4. For example, write command 1 includes an instruction to update counter 88 by adding 4.

The computing device 85 and/or another computing device of the DSN executes write command 1 to produce the updated counter 90. To execute write command 1, the computing device 85 (and/or the other computing device) obtains the plurality of sets of encoded data slices of the counter 88 from a set of storage units of the DSN. The computing device 85 decodes the plurality of sets of encoded data slices to produce the counter 88 and updates the counter 88 by adding 4 to produce the updated counter 90. The computing device 85 dispersed storage error encodes the updated counter 90 to produce an updated plurality of sets of encoded data slices, and sends the updated plurality of sets of encoded data slices to the set of storage units of the DSN for storage therein. After the counter is updated, the computing device 85 deletes write intents 1-4.

Figure 11A:
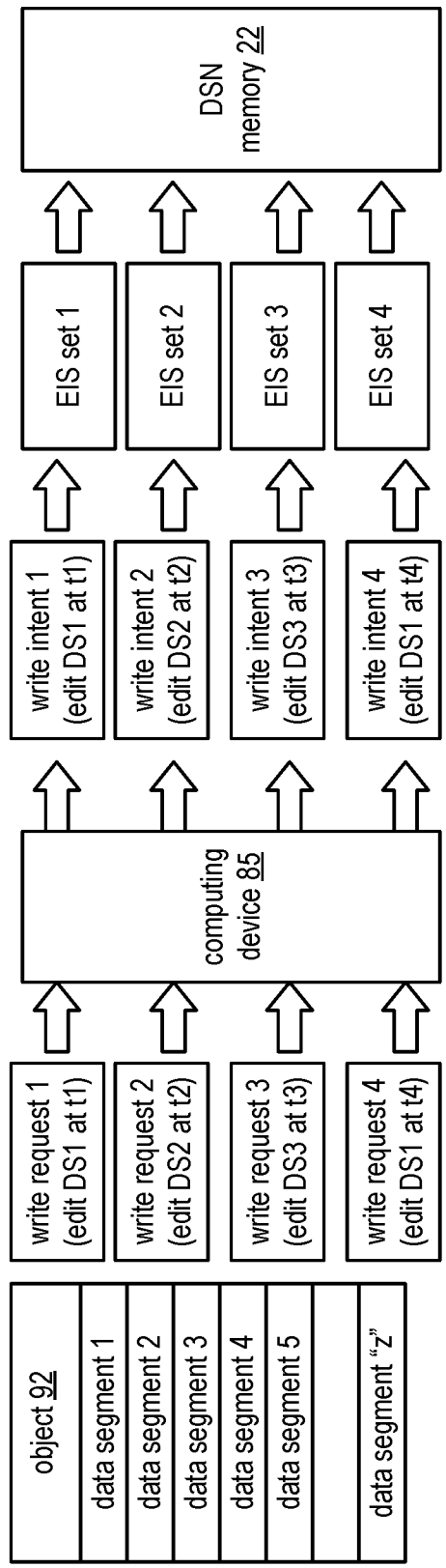
FIGS. 11A and 11B are schematic block diagrams of another example of updating an object using contention avoidance in accordance with the present invention.
Figure 11B:
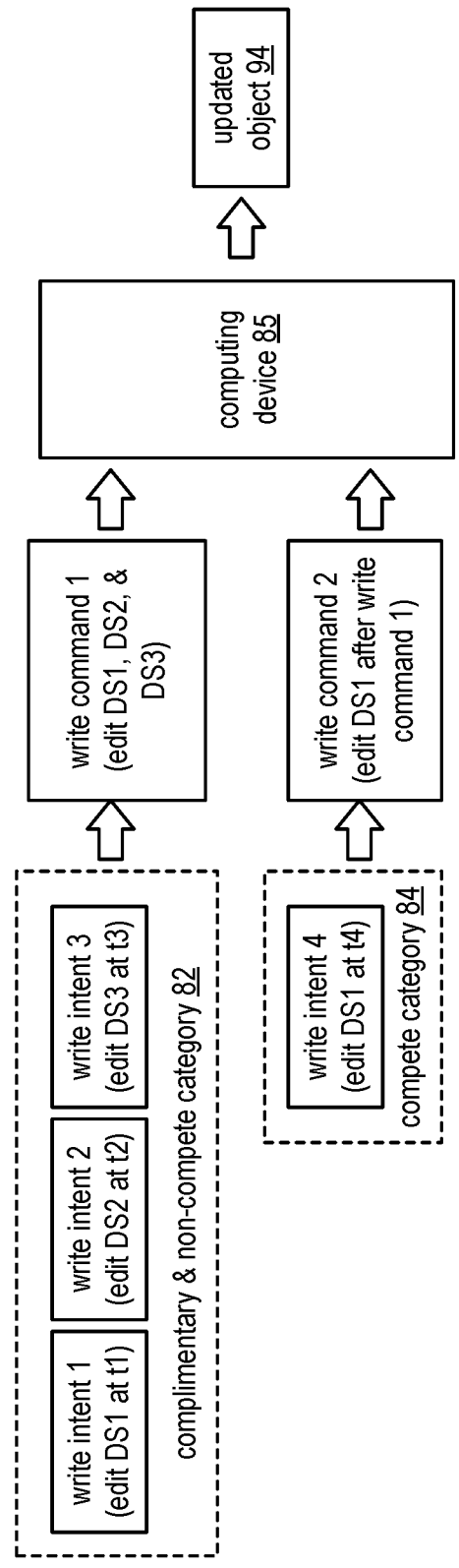

FIGS. 11A and 11B are schematic block diagrams of another example of updating an object using contention avoidance. FIG. 11A includes object 92 that includes data segments 1-z, computing device 85 (e.g., a DS processing unit or a storage unit) of a dispersed storage network (DSN), and DSN memory 22.

During a given time period, the computing device 85 receives a plurality of write requests (e.g., write requests 1-4) regarding updates to the object 92. In particular, computing device 85 receives write request 1 to edit data segment 1 (DS1) at time t1, write request 2 to edit data segment 2 (DS2) at time t2, write request 3 to edit data segment 3 (DS3) at time t3, write request 1 to edit data segment 1 (DS1) at time t4. The computing device 85 creates write intents 1-4 for write requests 1-4. A write intent message of the plurality of write intent messages includes a copy of a corresponding write request of the plurality of write requests and an intent overlay.

The computing device 85 dispersed storage error encodes the write intent messages 1-4 to produce a plurality of sets of encoded intent slices (e.g., EIS sets 1-4) and sends the plurality of sets of encoded intent slices to the DSN memory 22 for storage therein. After the expiration of the given time period, FIG. 11B depicts the computing device 85 categorizing each write intent message 1-4 with respect to each other write intent message 1-4 into a complimentary category, a non-compete category, or a compete category.

The computing device 85 determines that write intents 1-3 are in the non-compete category because each write intent 1-3 is regarding an update to a unique segment of the object 92 (e.g., an edit to data segment 1, an edit to data segment 2, and an edit to data segment 3). Write intents 1-3 are therefore categorized in the complimentary and non-compete category 82. A single write command (write command 1) is created to encompass write intents 1-3. For example, write command 1 includes an instruction to update object 92 by editing data segment 1, data segment 2, and data segment 3.

The computing device 85 determines that write intent 4 is in the compete category 84 because it is regarding an update to the same data segment (data segment 1) as write intent 1. The computing device 85 creates write command 2 for write intent 4 with an instruction to update object 92 by editing data segment 1 accordingly.

The computing device 85 and/or another computing device of the DSN executes write commands 1 and 2 to produce the updated object 94. To execute write commands 1 and 2, the computing device 85 (and/or the other computing device) obtains the plurality of sets of encoded data slices of the counter 88 from a set of storage units of the DSN. The computing device 85 decodes the plurality of sets of encoded data slices to produce the data segments of object 92 and updates the object 92 by editing data segments 1, 2 and 3 and then editing data segment 1 again in accordance with write command 2. The computing device 85 dispersed storage error encodes the updated object 94 to produce an updated plurality of sets of encoded data slices, and sends the updated plurality of sets of encoded data slices to the set of storage units of the DSN for storage therein. After the object is updated, the computing device 85 deletes write intents 1-4.

Figure 12:
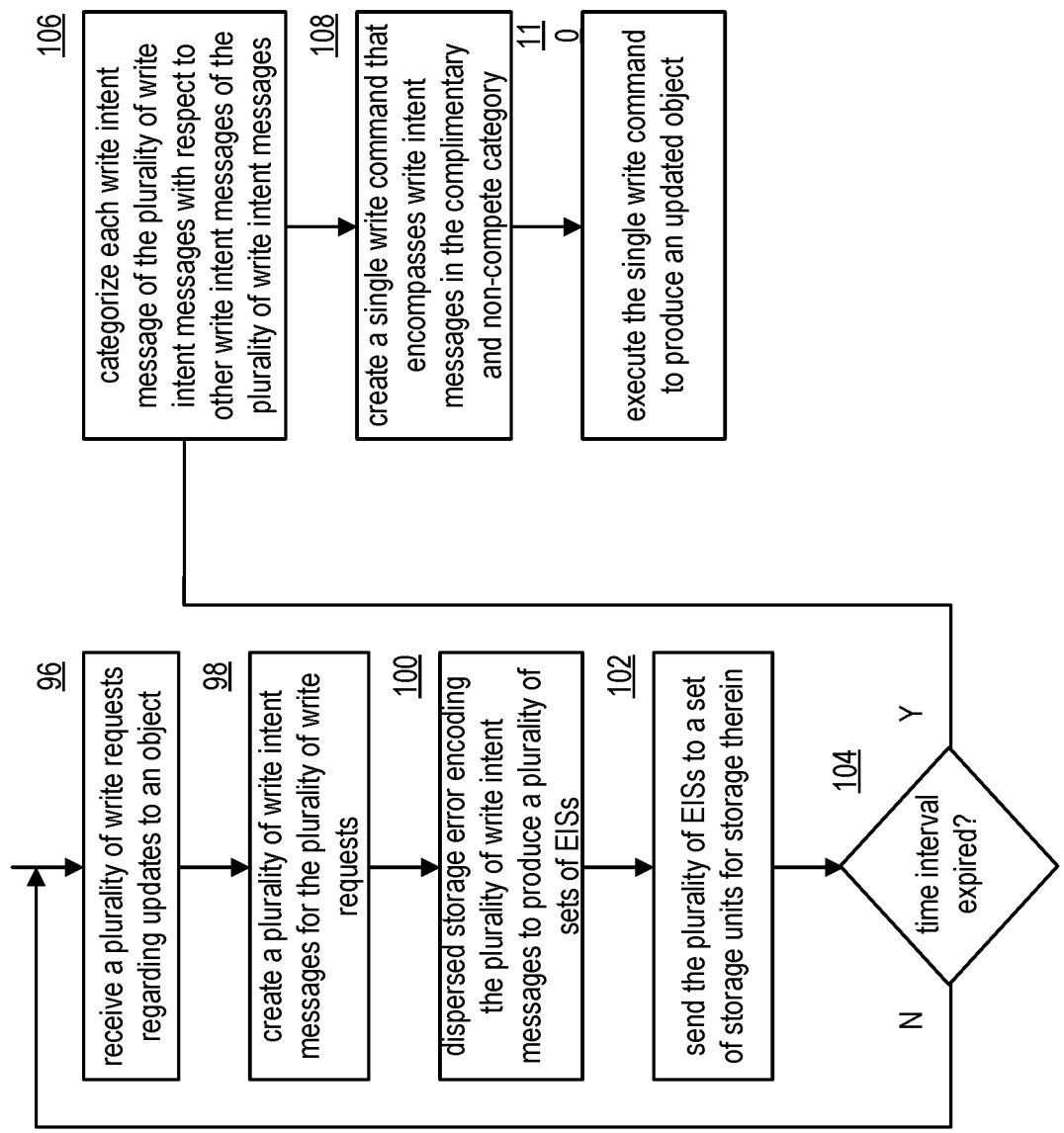
FIG. 12 is a logic diagram of an example of a method of updating an object using contention avoidance in accordance with the present invention.

FIG. 12 is a logic diagram of an example of a method of updating an object using contention avoidance. The method begins with step 96 where a computing device (e.g., a DS processing unit or a storage unit) of a dispersed storage network (DSN) receives a plurality of write requests regarding updates to an object. Frequent and contending updates to a single object can incur performance penalties. To first address this problem, the method continues with step 98 where the computing device creates a plurality of write intent messages for the plurality of write requests to ensure update consistency. A write intent message of the plurality of write intent messages includes a copy of a corresponding write request of the plurality of write requests and an intent overlay.

The method continues with step 100 where the computing device dispersed storage error encodes the plurality of write intent messages to produce a plurality of sets of encoded intent slices. The method continues with step 102 where the computing device sends the plurality of sets of encoded intent slices to a set of storage units of the DSN for storage therein. Persisting the write intent messages to the DSN memory guarantees durability of the update. However, having many write intent messages live in the DSN memory for long periods of time can have a significant performance impact and greatly increase the cost of the eventual update to the object. Grouping write intent messages of the plurality of write intent messages that are non-competing or complimentary (i.e., there is no contention between the updates) can greatly reduce write intent performance penalties.

The method continues to step 104 where the computing device determines whether the given time interval has expired. When the time interval has not expired, the method branches back to step 96 where the computing device continues receiving write requests. After the expiration of the time interval, the method continues to step 106 where the computing device categorizes each of the plurality of write intent messages with respect to other write intent messages of the plurality of write intent messages. A write intent message of the plurality of write intent messages is categorized in a complimentary category, a non-compete category, or a compete category.

The computing device determines that a write intent message is categorized in the complimentary category when the write intent message is regarding an update that is composable, commutative, and/or associative with one other update of the updates. Two updates (f1, f2) are composable if a third update (f1.f2) can be created such that applying f2 then f1 to the object is the same as applying (f1.f2) to the object. Two updates (f1, f2) are commutative if applying (f1.f2) to the object is the same as applying (f211) to the object. Two updates (f1, f2) are associative is applying f1.(f2.f3) to the object is the same as applying (f1.f2).f3 to the object.

The computing device determines that a write intent message is categorized in the non-compete category when the write intent message is regarding an update that is updating a unique segment of the object (e.g., a write intent message regarding updating a first segment of the object is non-competing in comparison to a write intent message regarding updating a second segment of the object). Write intent messages that are not categorized into the complimentary or non-compete category are categorized into the compete category.

The method continues with step 108 where the computing device creates a single write command that encompasses write intent messages in the complimentary category and the non-compete category. Individual write commands are created for any write intent messages that are categorized in the compete category.

The method continues with step 110 where the computing device and/or another computing device of the DSN executes the single write command on the object to produce an updated object. For example, the original computing device that received the plurality of write requests executes the single write command. Alternatively, another computing device associated with the object (e.g., an owner of the object) executes the single write command. To execute the single write command, the computing device and/or the other computing device obtains the plurality of sets of encoded data slices of the object from a set of storage units of the DSN. The computing device decodes the plurality of sets of encoded data slices to produce the object and updates the object in accordance with the single write command produce the updated object. The computing device dispersed storage error encodes the updated object to produce an updated plurality of sets of encoded data slices, and sends the updated plurality of sets of encoded data slices to the set of storage units of the DSN for storage therein. After the object is updated, the computing device deletes the plurality of write intent messages.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   during a given time interval:
   receiving, by a computing device, of a dispersed storage network (DSN), a plurality of write requests regarding updates to an object;
   creating, by the computing device, a plurality of write intent messages for the plurality of write requests;
   dispersed storage error encoding, by the computing device, the plurality of write intent messages to produce a plurality of sets of encoded intent slices;
   sending, by the computing device, the plurality of sets of encoded intent slices to a set of storage units of the DSN for storage therein; and
   after expiration of the given time interval:
   categorizing, by the computing device, each write intent message of the plurality of write intent messages with respect to other write intent messages of the plurality of write intent messages, wherein a write intent message of the plurality of write intent messages is categorized in a complimentary category, a non-compete category, or a compete category;
   creating, by the computing device, a single write command that encompasses write intent messages in the complimentary category and the non-compete category; and
   executing, by at least one of: the computing device and a second computing device, the single write command on the object to produce an updated object.

2. The method of claim 1 further comprises:
   deleting, by the computing device, the plurality of write intent messages after the object is updated.

3. The method of claim 1 further comprises:
   for each write intent message in the compete category, creating, by the computing device, an individual write command; and
   executing, by the at least one of: the computing device and the second computing device, each individual write command on the object to produce the updated object.

4. The method of claim 1, wherein the executing the single write command on the object comprises:
   obtaining, by the at least one of: the computing device and the second computing device, a plurality of sets of encoded data slices of the object from the set of storage units of the DSN;
   decoding, by the at least one of: the computing device and the second computing device, the plurality of sets of encoded data slices to produce the object;
   updating, by the at least one of: the computing device and the second computing device, the object in accordance with the single write command to produce the updated object;
   dispersed storage error encoding, by the at least one of: the computing device and the second computing device, the updated object to produce an updated plurality of sets of encoded data slices; and
   sending, by the at least one of: the computing device and the second computing device, the updated plurality of sets of encoded data slices to the set of storage units of the DSN for storage therein.

5. The method of claim 1, wherein the write intent message of the plurality of write intent messages comprises:
   a copy of a corresponding write request of the plurality of write requests; and
   an intent overlay.

6. The method of claim 1, wherein the categorizing comprises:
   determining, by the computing device, that the write intent message of the plurality of write intent messages is categorized in the complimentary category when the write intent message is regarding an update of the updates that is one or more of composable, commutative, and associative with one other update of the updates.

7. The method of claim 1, wherein the categorizing comprises:
   determining, by the computing device, that the write intent message of the plurality of write intent messages is categorized in the non-compete category when the write intent message is regarding an update of the updates that is updating a unique segment of the object.

8. A computer readable memory comprises:
   a first memory element that stores operational instructions that, when executed by a computing device of a dispersed storage network (DSN), causes the computing device to:
      during a given time interval:
         receive of a plurality of write requests regarding updates to an object;
         create a plurality of write intent messages for the plurality of write requests;
         dispersed storage error encode the plurality of write intent messages to produce a plurality of sets of encoded intent slices; and
         send the plurality of sets of encoded intent slices to a set of storage units of the DSN for storage therein; and
   a second memory element that stores operational instructions that, when executed by the computing device, causes the computing device to:
      after expiration of the given time interval:
         categorize each write intent message of the plurality of write intent messages with respect to other write intent messages of the plurality of write intent messages, wherein a write intent message of the plurality of write intent messages is categorized in a complimentary category, a non-compete category, or a compete category;
         create a single write command that encompasses write intent messages in the complimentary category and the non-compete category; and
   a third memory element that stores operational instructions that, when executed by the at least one of: the computing device and a second computing device, causes the at least one of the computing device and the second computing device to:
      execute the single write command on the object to produce an updated object.

9. The computer readable memory of claim 8, wherein the second memory element further stores operational instructions that, when executed by the computing device, causes the computing device to:
   delete the plurality of write intent messages after the object is updated.

10. The computer readable memory of claim 8 further comprises:
    the second memory element further stores operational instructions that, when executed by the computing device, causes the computing device to:
       for each write intent message in the compete category create an individual write command; and
    the third memory element further stores operational instructions that, when executed by the at least one of: the computing device and a second computing device, causes the at least one of: the computing device and the second computing device to:
       execute each individual write command on the object to produce the updated object.

11. The computer readable memory of claim 8, wherein the third memory element further stores operational instructions that, when executed by the at least one of: the computing device and the second computing device, causes the at least one of: the computing device and the second computing device to execute the single write command on the object by:
    obtaining a plurality of sets of encoded data slices of the object from the set of storage units of the DSN;
    decoding the plurality of sets of encoded data slices to produce the object;
    updating the object in accordance with the single write command to produce the updated object;
    dispersed storage error encoding the updated object to produce an updated plurality of sets of encoded data slices; and
    sending the updated plurality of sets of encoded data slices to the set of storage units of the DSN for storage therein.

12. The computer readable memory of claim 8, wherein the write intent message of the plurality of write intent messages comprises:
    a copy of a corresponding write request of the plurality of write requests; and
    an intent overlay.

13. The computer readable memory of claim 8, wherein the second memory element further stores operational instructions that, when executed by the computing device, causes the computing device to categorize by:
    determining that the write intent message of the plurality of write intent messages is categorized in the complimentary category when the write intent message is regarding an update of the updates that is one or more of composable, commutative, and associative with one other update of the updates.

14. The computer readable memory of claim 8, wherein the second memory element further stores operational instructions that, when executed by the computing device, causes the computing device to categorize by:
    determining that the write intent message of the plurality of write intent messages is categorized in the non-compete category when the write intent message is regarding an update of the updates that is updating a unique segment of the object.

* * * * *